United States Patent
Luna et al.

(10) Patent No.: US 8,051,565 B2
(45) Date of Patent: Nov. 8, 2011

(54) METHOD FOR INCREASING FATIGUE NOTCH CAPABILITY OF AIRFOILS

(75) Inventors: Alberto Luna, Greenville, SC (US); Joshua Leigh Miller, West Chester, OH (US); William Terence Dingwell, Lebanon, OH (US); Michael Jay Brunck, Cincinnati, OH (US); William Lee Imhoff, Hamilton, OH (US); Paul Moncelle, Cincinnati, OH (US); Dale Robert Lombardo, Blue Ash, OH (US); Andrew Philip Woodfield, Maineville, OH (US)

(73) Assignee: General Electric Company, Schenectady, NY (US)

( * ) Notice: Subject to any disclaimer, the term of this patent is extended or adjusted under 35 U.S.C. 154(b) by 1121 days.

(21) Appl. No.: 11/618,746

(22) Filed: Dec. 30, 2006

(65) Prior Publication Data

US 2008/0155802 A1 Jul. 3, 2008

(51) Int. Cl.
*B21D 53/78* (2006.01)
*B21K 3/04* (2006.01)

(52) U.S. Cl. ........... 29/889.7; 29/90.01; 29/90.7; 72/53; 72/75

(58) Field of Classification Search .................. 29/889.7, 29/90.01, 90.7; 72/11.1, 17.1, 53, 75, 377; 409/132; 416/179
See application file for complete search history.

(56) References Cited

U.S. PATENT DOCUMENTS

| | | |
|---|---|---|
| 2,393,317 A | 1/1946 | Edwards, Jr. et al. |
| 3,638,464 A | 2/1972 | Winter et al. |
| 3,690,140 A | 9/1972 | Shive |
| 3,695,091 A | 10/1972 | Smith |
| 3,950,642 A | 4/1976 | Feld |
| 4,428,213 A | 1/1984 | Neal et al. |
| 4,470,292 A | 9/1984 | DeClark et al. |
| 4,839,245 A | 6/1989 | Sue et al. |
| 4,909,859 A | 3/1990 | Nazmy et al. |
| 4,974,434 A | 12/1990 | Reccius et al. |
| 5,531,570 A | 7/1996 | Mannava et al. |
| 5,569,018 A | 10/1996 | Mannava et al. |
| 5,591,009 A | 1/1997 | Mannava et al. |
| 5,620,307 A | 4/1997 | Mannava et al. |

(Continued)

FOREIGN PATENT DOCUMENTS

CN 1550560 A 12/2004

(Continued)

OTHER PUBLICATIONS

Office Actrion issued in connection with corresponding Chinese Application No. 200710305279.4 on Aug. 4, 2010.

(Continued)

*Primary Examiner* — Richard Chang
(74) *Attorney, Agent, or Firm* — David J. Clement; Trego, Hines & Ladenheim, PLLC

(57) ABSTRACT

A method of reducing crack propagation in an airfoil includes: providing an airfoil having a root spaced apart from a tip, spaced-apart leading and trailing edges, a suction side extending from the leading edge to the trailing edge, and an opposed pressure side extending from the leading edge and the trailing edge, supporting the airfoil against bending loads; and burnishing the airfoil using a burnishing element, so as to create at least one burnished section of residual compressive stress, the at least one burnished section being located adjacent the leading edge and spaced from the leading edge by an offset distance selected so as to avoid deformation of the leading edge.

8 Claims, 5 Drawing Sheets

U.S. PATENT DOCUMENTS

| | | | |
|---|---|---|---|
| 5,666,841 | A | 9/1997 | Seeger et al. |
| 5,731,509 | A | 3/1998 | Thompson |
| 5,735,044 | A | 4/1998 | Ferrigno et al. |
| 5,756,965 | A | 5/1998 | Mannava |
| 5,771,729 | A | 6/1998 | Bailey et al. |
| 5,826,453 | A * | 10/1998 | Prevey, III .................. 72/75 |
| 5,846,057 | A | 12/1998 | Ferrigno et al. |
| 5,877,405 | A | 3/1999 | Champaigne |
| 5,932,120 | A | 8/1999 | Mannava et al. |
| 5,951,790 | A | 9/1999 | Mannava et al. |
| 6,005,219 | A | 12/1999 | Rockstroh et al. |
| 6,144,012 | A | 11/2000 | Dulaney et al. |
| 6,289,713 | B1 | 9/2001 | Champaigne |
| 6,415,486 | B1 | 7/2002 | Prevey, III |
| 6,483,578 | B1 | 11/2002 | Clauer et al. |
| 6,568,239 | B1 | 5/2003 | Champaigne |
| 6,622,570 | B1 | 9/2003 | Prevey, III |
| 6,672,838 | B1 | 1/2004 | Crall et al. |
| 6,752,593 | B2 | 6/2004 | Clauer et al. |
| 6,759,626 | B2 | 7/2004 | Clauer et al. |
| 6,893,225 | B2 | 5/2005 | Crall et al. |
| 6,959,572 | B2 | 11/2005 | Lawrence et al. |
| 6,969,821 | B2 | 11/2005 | Mika et al. |
| 7,097,720 | B2 | 8/2006 | Mannava et al. |
| 7,185,521 | B2 | 3/2007 | Lombardo et al. |
| 7,188,398 | B2 | 3/2007 | Prevey |
| 7,229,253 | B2 | 6/2007 | Broderick et al. |
| 7,261,500 | B2 * | 8/2007 | Killer et al. .................. 409/132 |
| 7,384,244 | B2 | 6/2008 | Broderick et al. |
| 7,530,792 | B2 | 5/2009 | Luna et al. |
| 7,600,404 | B2 * | 10/2009 | Prevey, III .................. 72/75 |
| 2005/0158460 | A1 | 7/2005 | Williams |
| 2005/0171703 | A1 | 8/2005 | Goldfine et al. |

FOREIGN PATENT DOCUMENTS

| | | |
|---|---|---|
| EP | 1175956 | 1/2002 |
| EP | 1261455 B1 | 8/2006 |
| JP | 61060875 | 3/1986 |
| WO | 9525821 | 9/1995 |
| WO | 0164398 | 9/2001 |
| WO | 2007055864 | 5/2007 |

OTHER PUBLICATIONS

Prevey, Paul S., Hornbach, Douglas, Ravindranath, Ravi, Cammett, J.T., "Application of Low Plasticity Burnishing to Improve Damage Tolerance of a Ti-6A1-4V First Stage Fan Blade", Proceedings 44th AIAA/ASME/ASCE/AHS Structures, Structural Dynamics & Materials Conf., Apr. 7-10, 2003, Lambda Technologies, Cincinnati, Ohio.

ASM International Handbook Committee, "ASM Handbook, vol. 4, Heat Treating", Aug. 1991, p. 607, ASM International, United States.

Prevey, P.S., Hornbach, D.J., Cammett, J.T., Ravindranath, R., "Damage Tolerance Improvement of Ti-6-4 Fan Blades with Low Plasticity Burnishing", 6th Joint FAA/DoD/NASA Aging Aircraft Conference, Sep. 16-19, 2002, pp. 1-9.

Prevey, Paul S., Telesman, Jack, Gabb, Timothy, Kantzos, Peter, "FOD Resistance and Fatigue Crack Arrest in Low Plasticity Burnish IN718", Proceedings: 5th National Turbine Engine High Cycle Fatigue Conference, Mar. 7-9, 2000, pp. 1-12, Lambda Technologies, Chandler, Arizona.

Ruschau, John J., John, Reji, Thompson, Steven R., Nicholas, Theodore, "Fatigue Crack Growth Rate Characteristics of Laser Shock Peened Ti-6A1-4V", "Journal of Engineering Materials and Technology", Jul. 1999, vol. 121, pp. 321-329, ASME.

Hammersley, Graham, Hackel, Lloyd A., Harris, Fritz, "Surface Prestressing to Improve Fatigue Strength of Components by Laser Shot Peening", "Optics and Lasers in Engineering", 2000, vol. 34, pp. 327-337, Elsevier Science Ltd.

* cited by examiner

METHOD FOR INCREASING FATIGUE NOTCH CAPABILITY OF AIRFOILS

BACKGROUND OF THE INVENTION

This invention relates generally to fatigue-resistant and damage-tolerant components and methods of producing such components.

Various metallic, ceramic, and composite components, such as gas turbine engine fan and compressor blades, are susceptible to cracking from fatigue and damage (e.g. from foreign object impacts). This damage reduces the life of the part, requiring repair or replacement.

It is known to protect components from crack propagation by inducing residual compressive stresses therein. Methods of imparting these stresses include shot peening, laser shock peening (LSP), pinch peening, and low plasticity burnishing (LPB). These methods are typically employed by applying a "patch" of residual compressive stresses over an area to be protected from crack propagation, for example a leading edge of a gas turbine engine compressor blade. However, shot peening is detrimental to the surface finish and has a lot of variation in its intensity even with industry standard control systems in place. Parts like compressor airfoils lose their efficiency with rough surface finishes produced by shot peening. Also, the residual stresses imparted by shot peening are very close to the surface of the part. Laser shock peening cans be expensive due to the required specimen preparation, equipment used, and personnel training requirements. Furthermore, both shot peening and laser shock peening can be relatively slow processes.

BRIEF SUMMARY OF THE INVENTION

The above shortcomings of the prior art, among others, are addressed by the present invention, which according to one aspect provides a method of reducing crack propagation in an airfoil, including: providing an airfoil having a root spaced apart from a tip, spaced-apart leading and trailing edges, a suction side extending from the leading edge to the trailing edge, and an opposed pressure side extending from the leading edge and the trailing edge; supporting the airfoil against bending loads; and burnishing the airfoil using a burnishing element, so as to create at least one burnished section of residual compressive stress, the at least one burnished section being located adjacent the leading edge and spaced from the leading edge by an offset distance selected so as to avoid deformation of the leading edge.

According to another aspect of the invention, an airfoil for a gas turbine engine includes: a root spaced apart from a tip, spaced-apart leading and trailing edges, a suction side extending from the leading edge to the trailing edge, and an opposed pressure side extending from the leading edge and the trailing edge, wherein a thickness of the airfoil is defined between the pressure side and the suction side; and at least one burnished section of residual compressive stress extending inward from a selected one of the pressure side and the suction sides. The burnished section is located adjacent the leading edge and spaced from the leading edge by an offset distance selected so as to avoid deformation of the leading edge.

According to another aspect of the invention, an apparatus is provided for burnishing a gas turbine blade having a dovetail and an airfoil extending radially outward therefrom, the airfoil having opposed leading and trailing edges extending between a root and a tip. The apparatus includes: a base with a transverse dovetail slot complementary to the dovetail of the compressor blade, formed in an upper surface of the base; a beam positioned aft of the dovetail slot and extending upwardly from the base, the beam including a bearing surface generally facing the dovetail slot, wherein the beam is positioned relative to the dovetail slot such that the bearing surface will contact and provide support to the trailing edge of the airfoil when the blade is loaded in the fixture; and a clamping apparatus for securing the airfoil against the beam.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
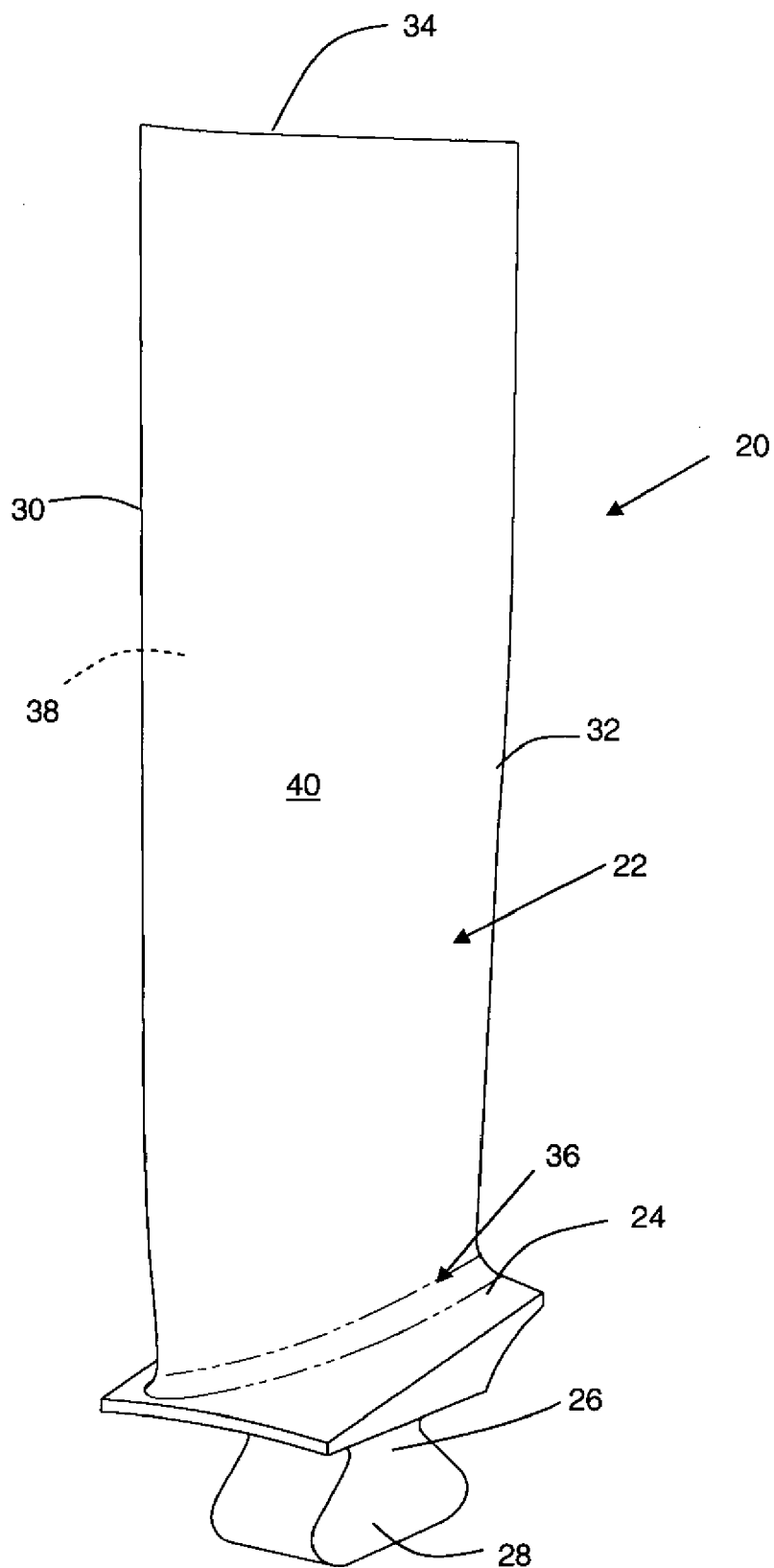
FIG. 1 is a perspective view of a prior art compressor blade.

Referring to the drawings wherein identical reference numerals denote the same elements throughout the various views, FIG. 1 illustrates an exemplary gas turbine engine compressor blade 20, before treatment. This component is used merely as an example of a part to which the method of the present invention may be applied the present invention is equally applicable to other types of components susceptible to cracking from fatigue or damage, such as compressor stator vanes, fan blades, turbine blades, shafts and rotors, stationary frames, actuator hardware and the like. Such components may be made from metal alloys, ceramics, or composite materials (e.g. carbon fiber composites). Typically, such blades are made of an alloy based on titanium, iron, or nickel. Examples of such alloys that are commercially available include Ti6-4, Ti 6-2-4-2, A-286, C 450, and In 718. The compressor blade 20 includes an airfoil 22, a platform 24, and a shank 26. In this particular example the shank 26 includes a dovetail 28 for being received in a slot of a rotating disk (not shown). The airfoil 22 has a leading edge 30, a trailing edge 32, a tip 34, a root 36, a pressure side 38, and a suction side 40 opposite the pressure side 38.

Figure 2:
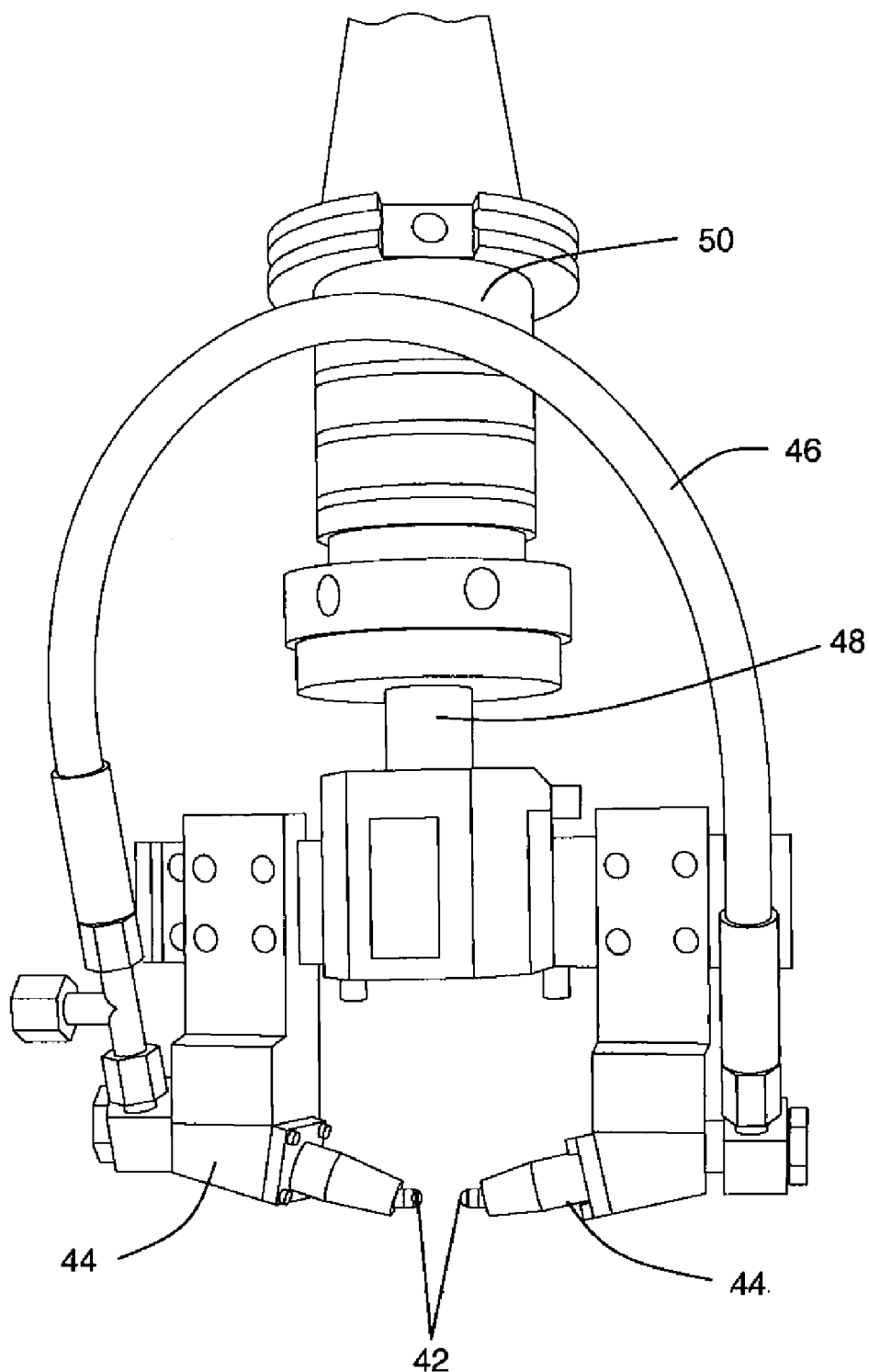
FIG. 2 is a perspective view of a burnishing apparatus for use with the present invention.

FIG. 2 illustrates an apparatus for treating the compressor blade 20 according to the present invention. The apparatus includes burnishing elements 42, which in this example are spheres of about 6 mm (0.2 in.) diameter made of tungsten carbide. Other sizes and shapes, such as cylindrical rollers, as well as different materials, could also be used. Burnishing heads 44 of a known type hold the burnishing elements 42 in an opposed relationship. Pressurized fluid supplied to the burnishing heads through hydraulic line 46 is used to apply hydrostatic pressure to the burnishing elements 42. The burnishing elements 42 could also be mechanically loaded. The burnishing heads 44 are mounted to a spindle 48 which is in turn carried by a multi-axis numerical- or computer-controlled manipulator 50 of a known type.

Figure 3:
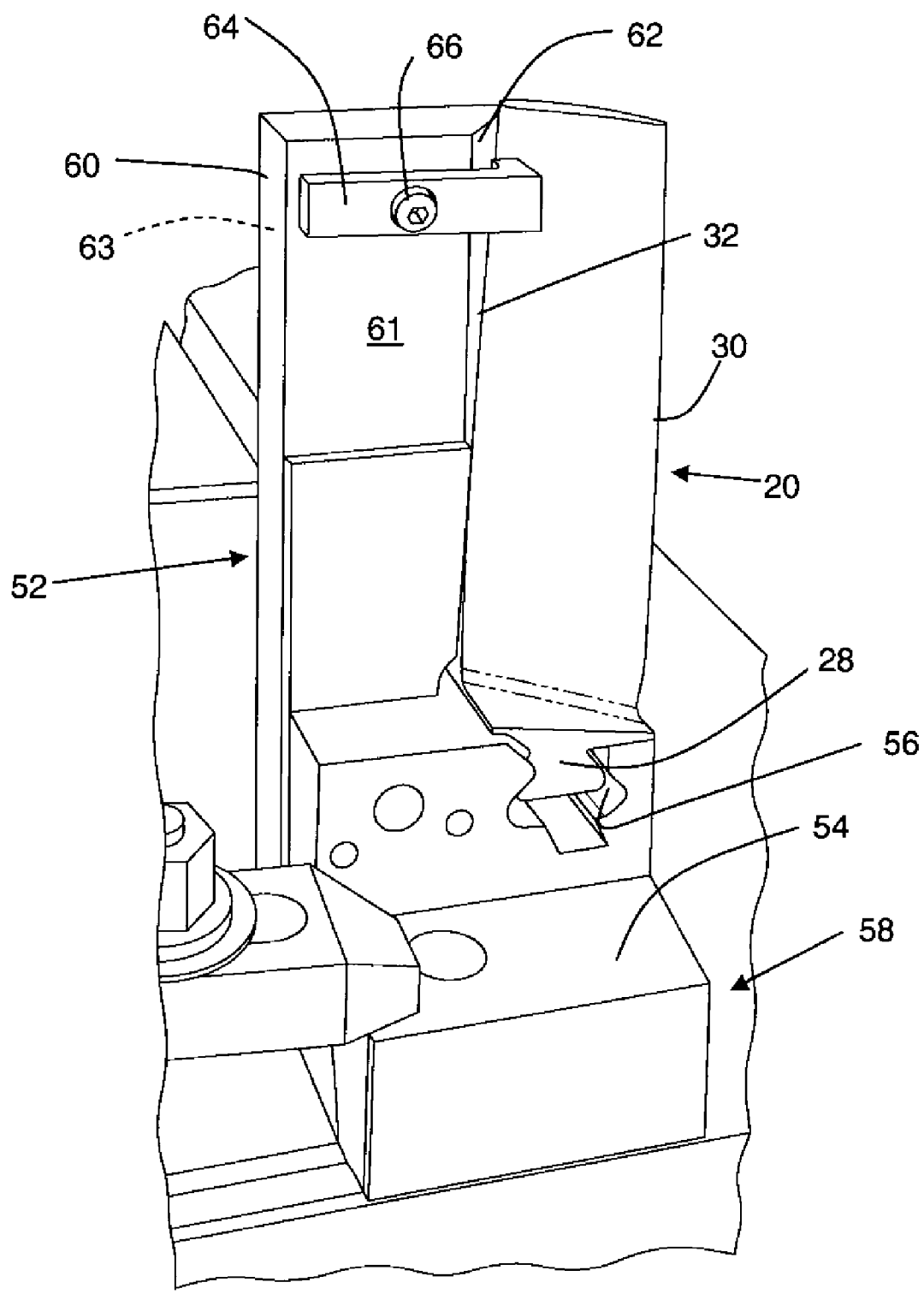
FIG. 3 is a perspective view of a fixture constructed according to an aspect of the present invention with a compressor blade mounted therein.

FIG. 3 illustrates a fixture 52 used to support the airfoil 22 during the burnishing operation so as to avoid inducing bending stresses therein. The fixture 52 includes a base 54 with a transverse dovetail slot 56 complementary to the dovetail 28 of the compressor blade 20. The dovetail slot 56 is formed in an upper surface of the base 54 near its forward end 58. A beam 60 is positioned aft of the dovetail slot 56 and extends upwardly from the base 54 the beam 60 has front and rear faces 61 and 63 and includes a chamfered or angled bearing surface 62 at its forward end. The bearing surface 62 is generally positioned at an acute angle to the front face 61. The beam 60 is positioned so that the bearing surface 62 will contact and provide support to the trailing edge 32 of the airfoil 22 when it is loaded in the fixture 52. Means are provided for clamping the airfoil 22 to the beam 60. In the illustrated example, an L-shaped clamp bar 64 is secured to the upper end of the beam 60 with a bolt 66. The clamp bar 64 ensures that the trailing edge 32 of the airfoil 22 stays in contact with the bearing surface 62, as shown in FIG. 3, during a burnishing operation.

Figure 5:
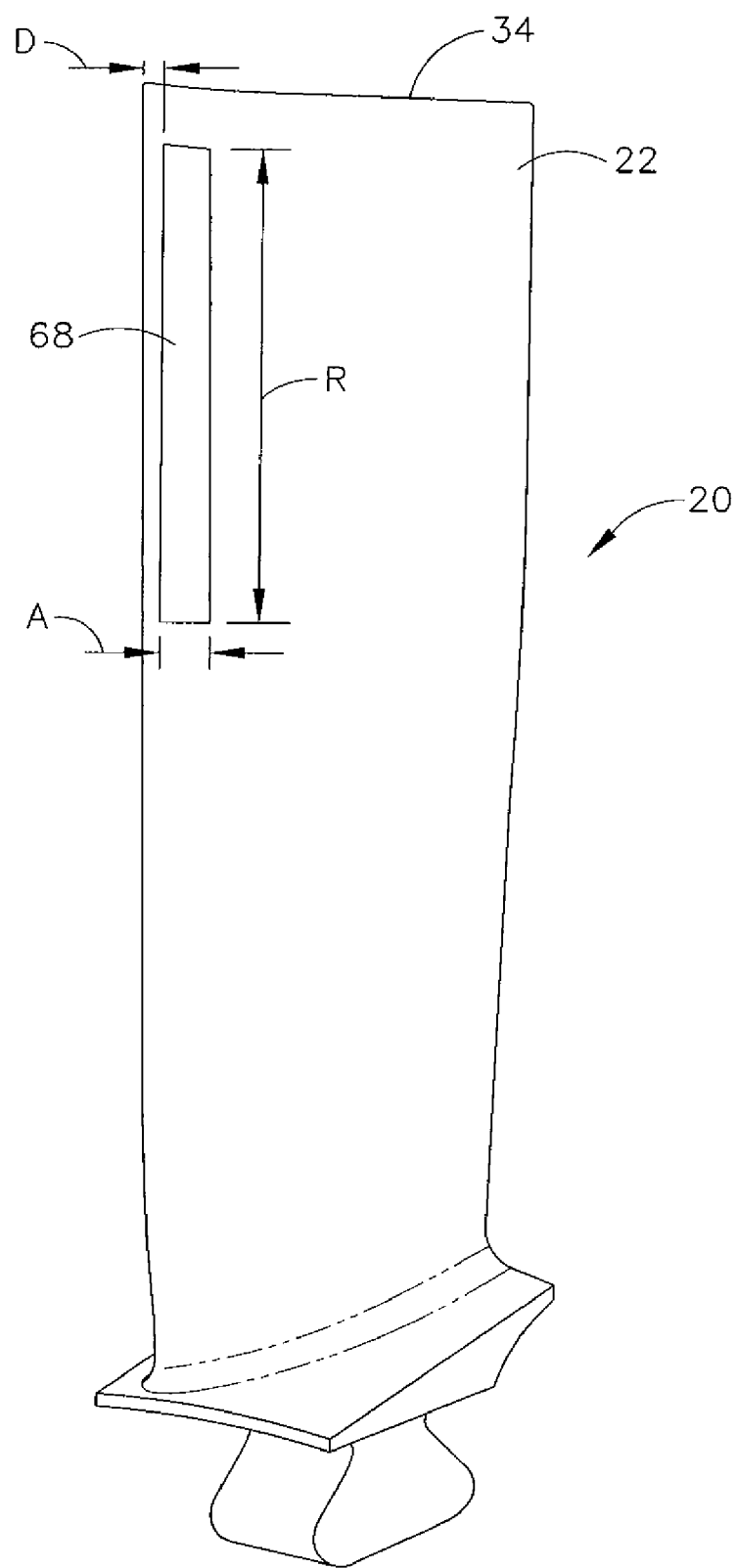
FIG. 5 is a perspective view of a compressor blade treated in accordance with an aspect of the present invention.

The burnishing operation is accomplished by using the burnishing elements 42 to burnish a line or trace on the surface of the compressor blade 20, creating a burnished section 68 having residual compressive stresses, shown in FIG. 5. In the illustrated example, the burnished section 68 is located near the tip portion of the leading edge 30 of the airfoil 22, with its outer border about 3.18 mm (0.125 in.) from the tip 34. The burnished section 68 has a radial length "R" of about 58.75 mm (2.313 in.), and an axial length "A" of about 6.4 mm (0.250 in.). The profile of the leading edge 30 of the airfoil 22 has a critical affect on the aerodynamic efficiency. Accordingly, to avoid deformation of the leading edge 30, the limits of the burnished section 68 are offset a preselected distance "D" from the leading edge 30, for example about 0.76 mm (0.030 in.). This distance "D" is not shown to scale in FIG. 5. It has been found that this location of the burnished section 68 provides enhanced fatigue notch capability without interfering with the leading edge profile.

Figure 4:
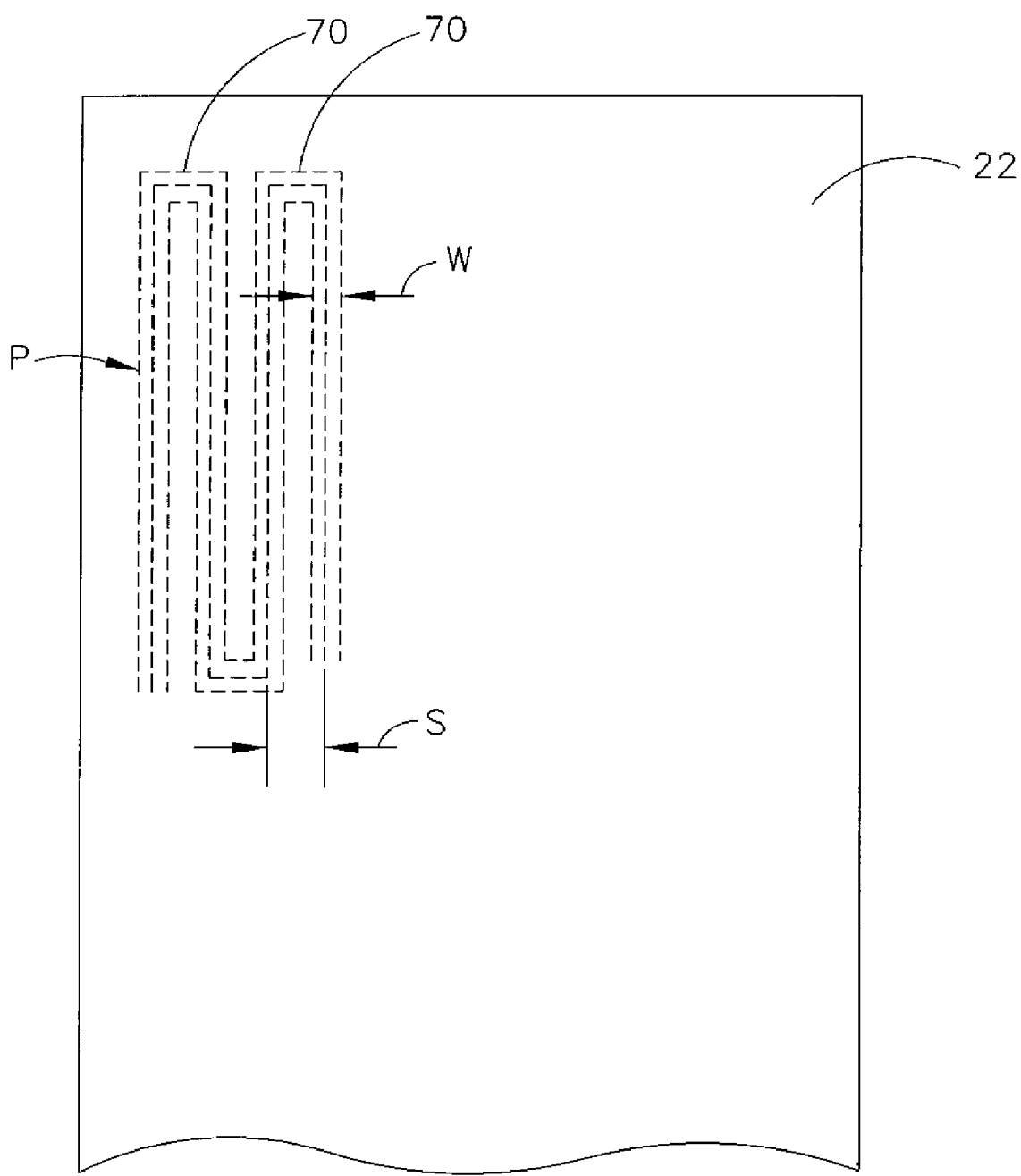
FIG. 4 is an enlarged side view of a portion of a compressor blade being treated in accordance with an aspect of the present invention.

For a given material, the combination of burnishing pressure, burnishing element size, step over, tool path, burnishing method and location of burnished section 68 will determine the fatigue notch capability. In FIG. 4, the burnishing element 42 is shown tracing out a burnishing path "P" along the surface of the airfoil 22. It is noted that the path P is shown greatly exaggerated for illustrative purposes. In this example, the path "P" includes a plurality of linear segments 70 arranged in a series of S-turns. The path has a footprint with a width "W" determined by the width of the burnishing element 42 and the applied pressure. The linear segments 70 are separated by a step-over distance "S". In cases where the step-over distance S is less than the width W, overlap of the segments 70 will occur. The burnishing pressure used in the illustrated example was about 150 bar (2175 psi) and the step over distance S was about 0.076 mm (0.003 in.) The velocity of the burnishing tools 14 was chosen such that the total processing time was about 1 minute. The airfoil 22 was burnished simultaneously on both sides to minimize its distortion while secured in the fixture 52. The combination of simultaneous two-side burnishing, along with the support provided by the fixture, reduces distortion during processing. More specifically, the restraint of the airfoil 22 against the bearing surface 62 prevented any asymmetric loading of the burnishing elements from imparting bending stresses in the airfoil 22.

Final fatigue testing of compressor blade 20 treated in accordance with the above-described process showed a fatigue notch capability increase of almost 5 times baseline (untreated) with an airfoil chord angle distortion of less than about 0.75 degrees and a surface cold work measurement of at least about 9%.

The foregoing has described fatigue- and damage-resistant components and methods for making such components. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of reducing crack propagation in an airfoil, comprising:
   providing an airfoil having a root spaced apart from a tip, spaced-apart leading and trailing edges, a suction side extending from the leading edge to the trailing edge, and an opposed pressure side extending from the leading edge and the trailing edge;
   providing a fixture for supporting the airfoil comprising a base and a beam extending upwardly from the base defining an elongated angled bearing surface;
   loading the airfoil into the fixture such that the root of the airfoil is received by the base and the angled bearing surface extends parallel to the trailing edge of the airfoil in contact with the trailing edge, so as to support the airfoil against bending loads;
   clamping the airfoil to the beam to ensure contact between the trailing edge and the angled bearing surface during a subsequent burnishing step; and
   burnishing the airfoil using a burnishing element, so as to create at least one burnished section of residual compressive stress, the at least one burnished section being located adjacent the leading edge and spaced from the leading edge by an offset distance selected so as to avoid deformation of the leading edge.

2. The method of claim 1 wherein the offset distance is at least about 0.76 mm.

3. The method of claim 1 wherein the burnishing element is a rotating sphere loaded against the airfoil by hydrostatic pressure.

4. The method of claim 3 wherein the burnishing element is about 6 mm in diameter.

5. The method of claim 3 wherein the hydrostatic pressure is about 150 bar.

6. The method of claim 1 wherein the burnishing element is translated in a preselected path including a plurality of linear segments arranged in a series of S-turns separated by a preselected step-over distance.

7. The method of claim 6 wherein the step-over distance is about 0.076 mm.

8. The method of claim 1 wherein the pressure and suction sides of the airfoil are simultaneously burnished.

\* \* \* \* \*